(12) United States Patent
Bauer et al.

(10) Patent No.: US 10,315,361 B2
(45) Date of Patent: Jun. 11, 2019

(54) METHOD OF FORMING RACEWAY KNOCKOUT

(71) Applicant: Bemis Manufacturing Company, Sheboygan Falls, WI (US)

(72) Inventors: David Bauer, Saukville, WI (US); Scott Kletzien, Waldo, WI (US); Jim Smith, Sheboygan, WI (US)

(73) Assignee: CUP ACQUISITION, LLC, Grand Rapids, MI (US)

( * ) Notice: Subject to any disclaimer, the term of this patent is extended or adjusted under 35 U.S.C. 154(b) by 329 days.

(21) Appl. No.: 15/257,055

(22) Filed: Sep. 6, 2016

(65) Prior Publication Data

US 2016/0368203 A1    Dec. 22, 2016

Related U.S. Application Data

(63) Continuation of application No. 13/837,981, filed on Mar. 15, 2013, now Pat. No. 9,458,629.

(60) Provisional application No. 61/707,375, filed on Sep. 28, 2012.

(51) Int. Cl.
*B32B 37/00* (2006.01)
*B29C 65/08* (2006.01)
*E04B 2/74* (2006.01)
*B29C 65/00* (2006.01)

(52) U.S. Cl.
CPC .......... *B29C 65/08* (2013.01); *B29C 66/1142* (2013.01); *B29C 66/21* (2013.01); *B29C 66/24244* (2013.01); *B29C 66/472* (2013.01); *B29C 66/5326* (2013.01); *B29C 66/81431* (2013.01); *B29C 66/81433* (2013.01); *E04B 2/7407* (2013.01); *B29C 66/73921* (2013.01); *B29C 66/81423* (2013.01); *B29C 66/8322* (2013.01); *B29C 66/949* (2013.01); *B29C 66/9513* (2013.01); *B29C 66/9517* (2013.01); *E04B 2002/7488* (2013.01)

(58) Field of Classification Search
CPC ..... B29C 65/08; B29C 66/1142; B29C 66/21; B29C 66/24244; B29C 66/472; B29C 66/5326; B29C 66/81431; B29C 66/81433; E04B 2/7407
USPC .......................................... 156/580.1, 580.2
See application file for complete search history.

(56) References Cited

U.S. PATENT DOCUMENTS

| | | | |
|---|---|---|---|
| 2,060,863 A | 11/1936 | Hasse | |
| 3,580,122 A | 5/1971 | Powell | |
| 3,666,602 A | 5/1972 | Obeda | |
| 3,867,232 A | 2/1975 | Thompson et al. | |
| 4,362,078 A | 12/1982 | Ohnishi et al. | |
| 4,572,753 A | 2/1986 | Bach | |
| 4,611,480 A | 9/1986 | Willetts | |

(Continued)

FOREIGN PATENT DOCUMENTS

| | | |
|---|---|---|
| DE | 202005003067 | 5/2005 |
| DE | 102010039001 | 2/2012 |

(Continued)

*Primary Examiner* — James D Sells
(74) *Attorney, Agent, or Firm* — Moore & Van Allen PLLC

(57) ABSTRACT

A method for forming a knockout on a raceway includes removing a knockout from the raceway to form an opening, positioning the knockout within the opening, and thereafter attaching the knockout to the raceway by welding the knockout and the raceway together.

17 Claims, 8 Drawing Sheets

(56) References Cited

U.S. PATENT DOCUMENTS

| | | | |
|---|---|---|---|
| 4,767,492 A * | 8/1988 | Fukusima | B29C 65/08 |
| | | | 156/580.2 |
| 4,785,655 A | 11/1988 | Pistritto et al. | |
| 5,195,287 A | 3/1993 | Bruggink | |
| 5,525,172 A | 6/1996 | Cadiou | |
| 6,299,050 B1 | 10/2001 | Okamura et al. | |
| 6,396,195 B1 | 5/2002 | Lindblad et al. | |
| 7,374,626 B2 * | 5/2008 | Van Der Leden | A61F 5/445 |
| | | | 156/580.2 |
| 2004/0231283 A1 | 11/2004 | LaSusa | |
| 2011/0248069 A1 | 10/2011 | Khakhalev | |
| 2012/0097339 A1 | 4/2012 | Hull | |
| 2013/0213552 A1 | 8/2013 | Kelch et al. | |

FOREIGN PATENT DOCUMENTS

| | | |
|---|---|---|
| JP | 56134026 | 10/1981 |
| JP | 60248336 | 12/1985 |
| JP | 2005088067 | 4/2005 |
| JP | 2006278849 | 10/2006 |
| JP | 2007330851 | 12/2007 |
| JP | 2008000638 | 1/2008 |
| JP | 201183675 | 9/2011 |
| WO | 2012007325 | 1/2012 |

\* cited by examiner

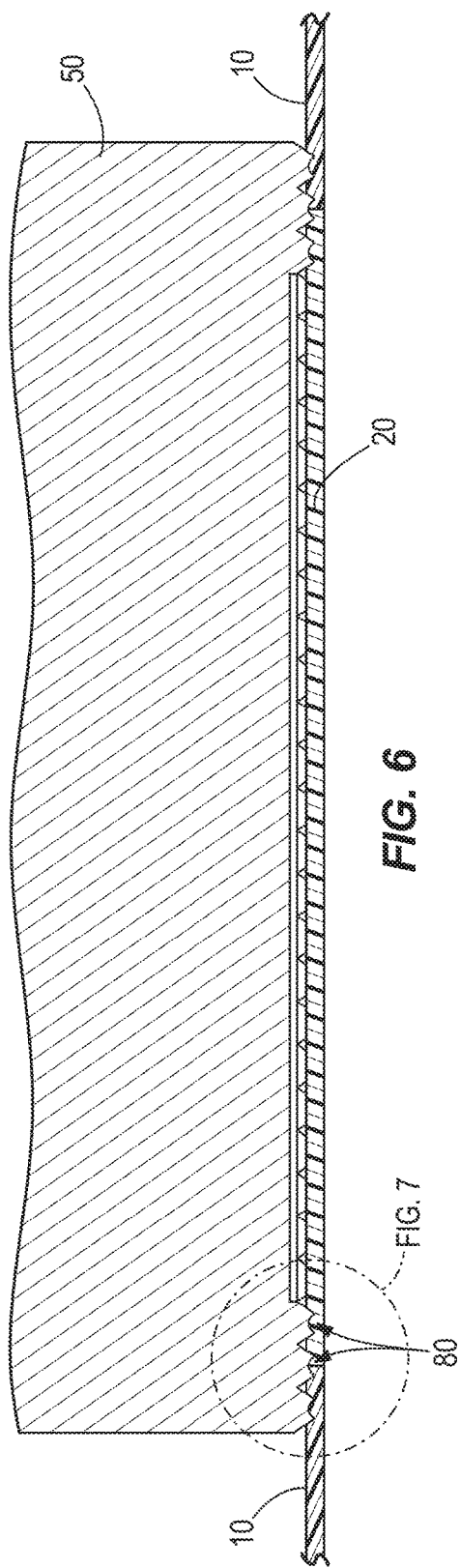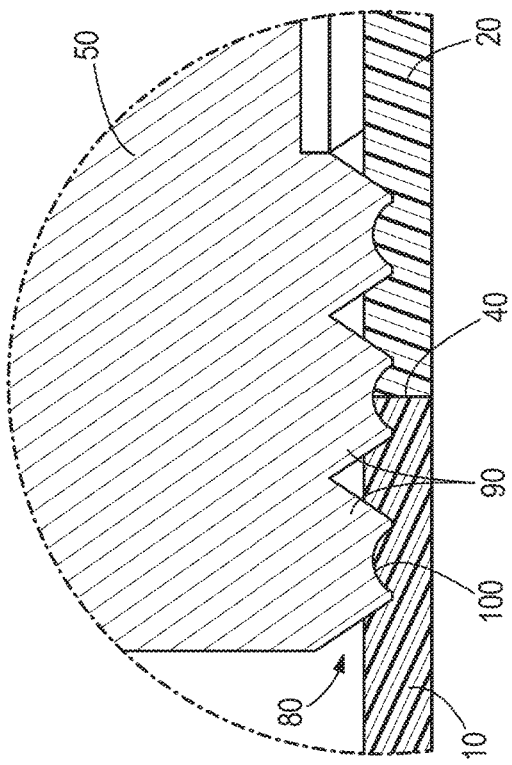

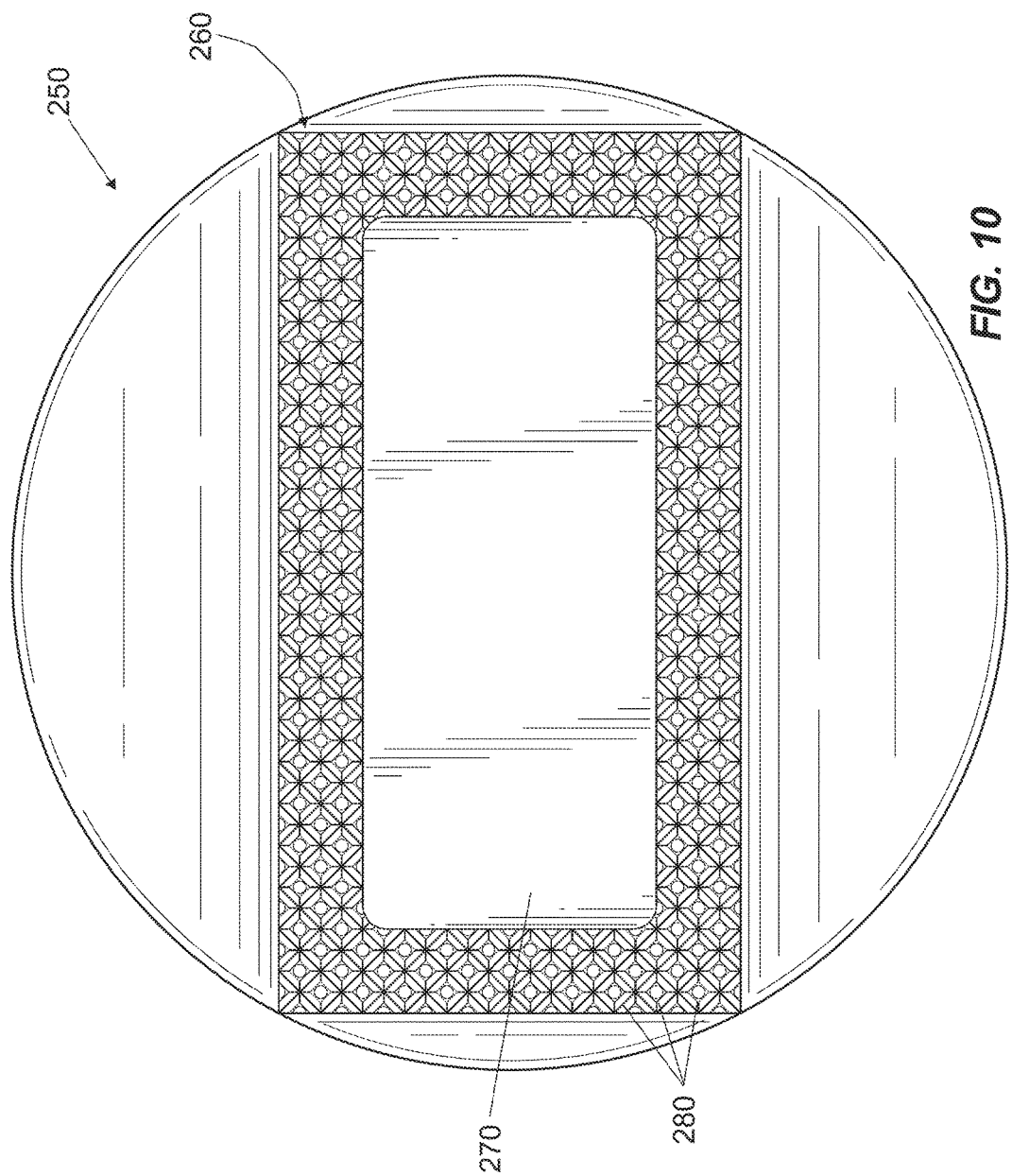

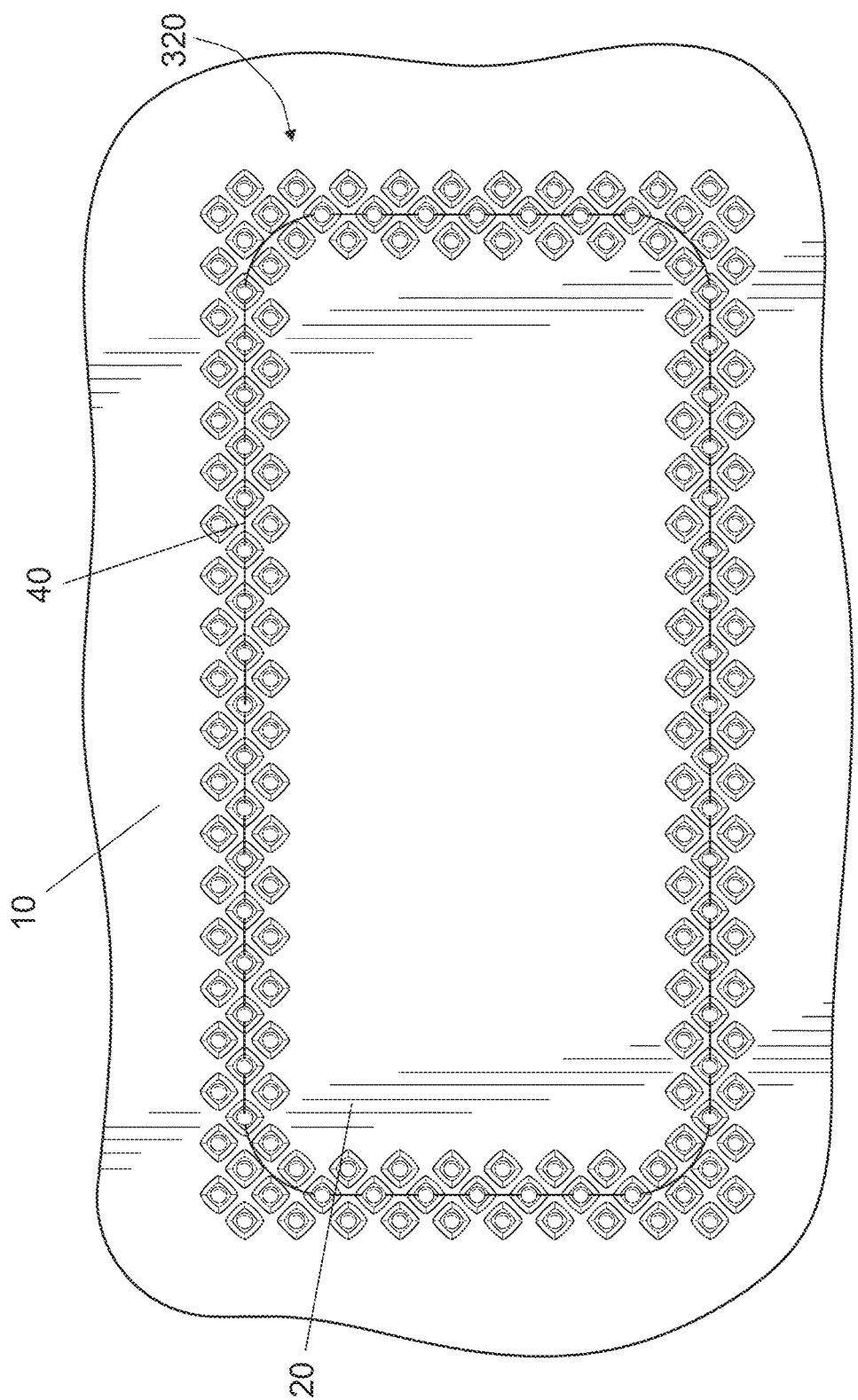

METHOD OF FORMING RACEWAY KNOCKOUT

CROSS-REFERENCE TO RELATED APPLICATIONS

This application is a continuation of U.S. patent application Ser. No. 13/837,981, filed Mar. 15, 2013, which claims priority to U.S. Provisional Patent Application No. 61/707,375, filed Sep. 28, 2012. The entire contents of both applications are incorporated by reference herein.

BACKGROUND OF THE INVENTION

The present invention relates to raceway knockouts, such as disclosed in U.S. Pat. No. 5,195,287. A conventional office panel or raceway supports electrical and telecommunications wire or conduit. The raceway includes optional blank or knockout portions to permit a user to access the wires. In general, the knockout is formed by removing the blank from the raceway, creating an opening. The knockout is then inserted into the opening and re-attached to the raceway. Although various methods are known for re-attaching the knockout, these methods suffer from two main flaws. First, the knockout is too readily removable from the raceway such that the knockout can be separated from the raceway unintentionally. Second, the knockout or an attaching element stands proud of the raceway, so that the knockout and the raceway do not form a seam that is flush with the raceway.

SUMMARY OF THE INVENTION

In one embodiment, the invention provides a method for forming a knockout on a raceway. The method includes removing a knockout from the raceway to form an opening, positioning the knockout within the opening, and thereafter attaching the knockout to the raceway by welding the knockout and the raceway together.

In another embodiment, the invention provides a method for joining a first plastic workpiece and second plastic workpiece. The method includes positioning an edge of the first workpiece adjacent an edge of the second workpiece so that the edges engage one another in a facing relationship; positioning a welding horn adjacent the first workpiece and the second workpiece, a welding surface of the welding horn being in contact with both the first workpiece and the second workpiece; and welding the edges of the first and second workpieces together by an ultrasonic welding process.

In yet another embodiment, the invention provides a welding horn for welding plastic material along a weld seam. The welding horn includes a welding surface adapted to weld the plastic material and a plurality of energy directors. The plurality of energy directors are positioned on the welding surface and each energy director includes a truncated pyramid having a recessed peak.

BRIEF DESCRIPTION OF THE DRAWINGS

FIG. 6 is a cross-section view of the welding horn during a welding process.

FIG. 7 is an enlarged portion of FIG. 5.

FIG. 10 is a plan view of a welding horn according to another embodiment.

FIG. 11 is a plan view of one side of the raceway of FIG. 2 with the knockout re-attached by the welding horn of FIG. 10.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
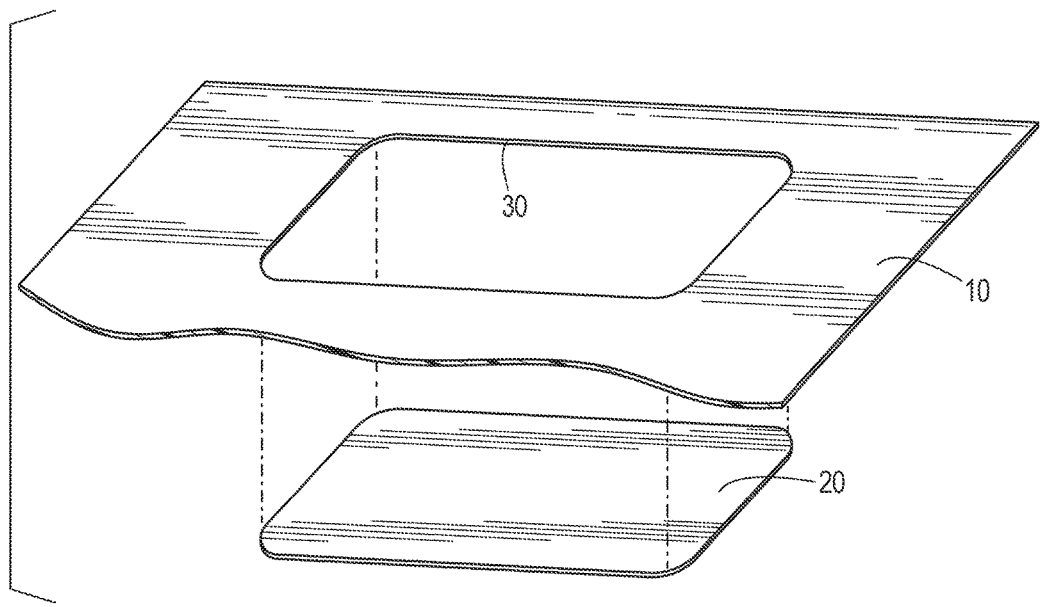
FIG. 1 is a perspective view of a raceway and a knockout removed from the raceway.

FIG. 1 shows a first workpiece, such as a panel or raceway 10, and a second workpiece, such as a blank or knockout 20, that is formed by punching or removing a portion of the raceway 10 and thereby forming a slot or opening 30 on the raceway 10. In one embodiment, the raceway 10 and knockout 20 are made from a plastic or polymeric material and the knockout 20 is removed from the raceway 10 by a punching process. In the illustrated embodiment, the knockout 20 has a generally rectangular shape with rounded corners. In addition, the opening 30 is completely enclosed by the raceway 10. In other embodiments, the knockout 20 may have a different shape, or the opening 30 may be formed along an edge of the raceway 10.

Figure 2:
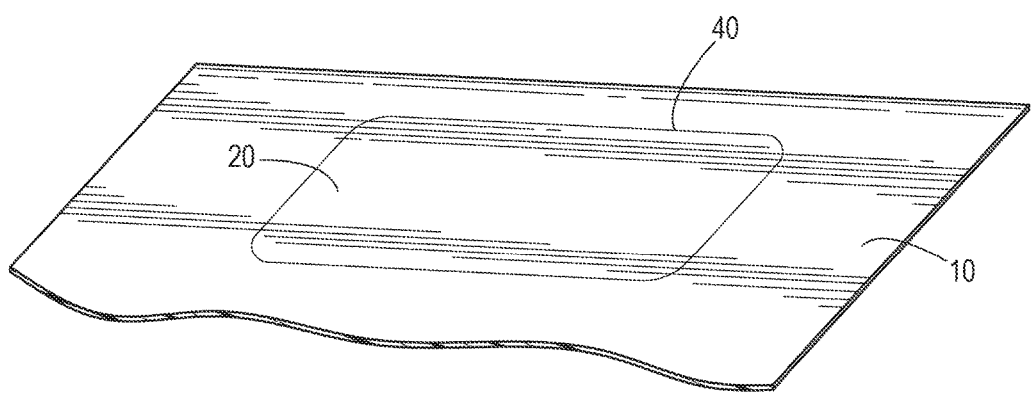
FIG. 2 is a perspective view of the raceway of FIG. 1 with the knockout inserted in an opening of the raceway.

As shown in FIG. 2, after the knockout 20 has been removed from the raceway 10, the knockout 20 is re-positioned within the opening 30. In one embodiment, the knockout 20 is held in place by friction between the edges of the knockout 20 and the edges of the raceway 10. The knockout 20 is aligned with the raceway 10 so that each edge of the knockout 20 is directly adjacent and abuts an edge of the raceway 10, thereby forming a seam 40 between the raceway 10 and the knockout 20. That is, the edges of the knockout 20 are positioned to engage the edges of the raceway 10 around the opening 30 in a facing relationship so that there is no overlap between the knockout 20 and the raceway 10. Stated another way, the knockout 20 is coterminous with the opening 30. In one embodiment, the knockout 20 is removed from and re-inserted into the raceway 10 by a double-punch apparatus that punches the knockout 20 out of the raceway 10 in a first motion and moves the knockout 20 back into the opening 30 in the second motion. In some embodiments, the knockout 20 and the raceway 10 are positioned in a side-by-side relationship such that at least one edge of the knockout 20 and one edge of the raceway 10 are directly adjacent and abut one another.

Figure 3:
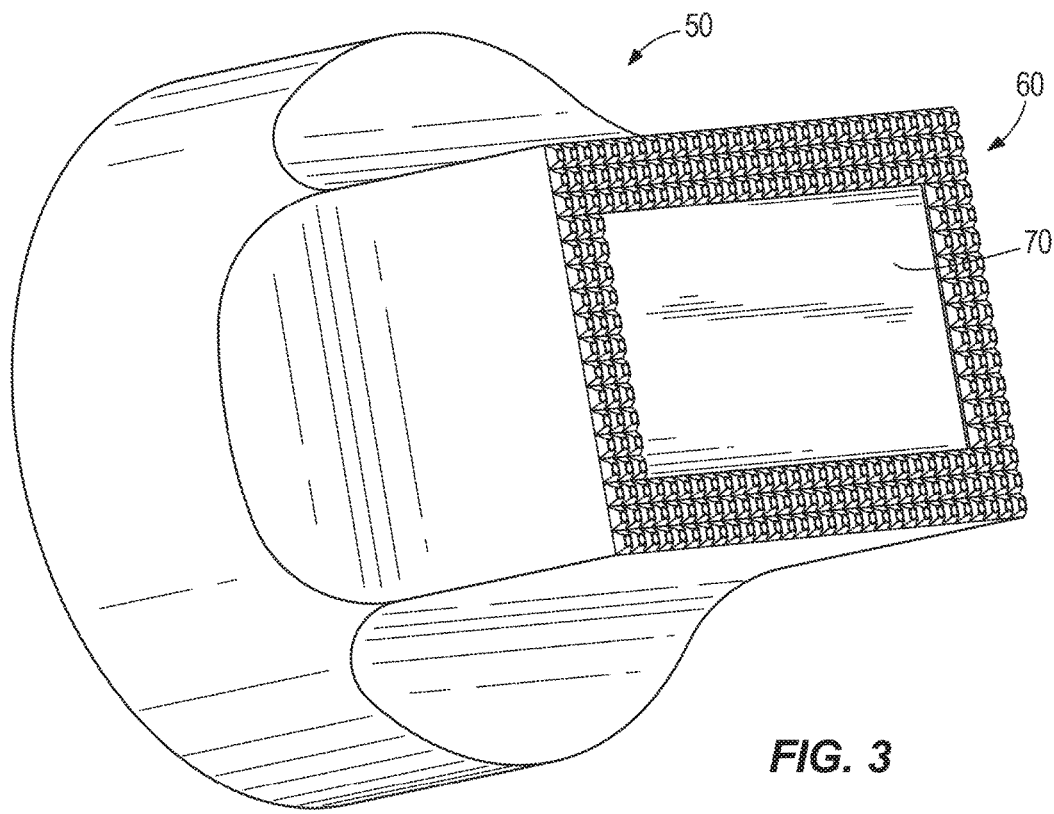
FIG. 3 is a perspective view of a welding horn.

FIG. 3 shows a sonotrode or welding horn 50 for welding the knockout 20 to the raceway 10 by an ultrasonic welding process. The horn 50 includes a welding surface 60. The welding surface has a profile or shape that corresponds to the shape of the seam 40. In the illustrated embodiment, the horn 50 includes a non-welding surface positioned adjacent the welding surface 60. The welding surface 60 has a rectangular shape and at least partially encloses the non-welding surface 70. In other embodiments, the welding surface 60 and/or the non-welding surface 70 can have a different shape configured to apply an acoustic vibration along the interface between the raceway 10 and the knockout 20.

Figure 4:
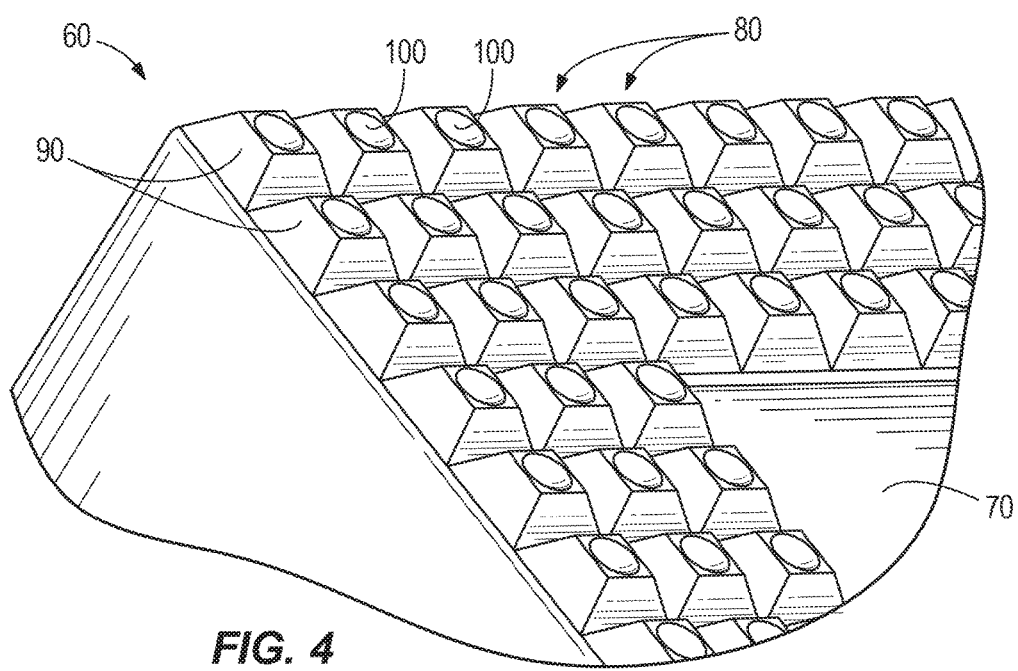
FIG. 4 is an enlarged perspective view of the welding horn of FIG. 3.

As shown in FIG. 4, the welding surface 60 includes multiple energy directors 80 for forming welds along the seam 40. Each energy director 80 is formed as a truncated pyramid 90 having a recessed peak 100. In the illustrated embodiment, the recessed peak 100 is formed as a dimple having a generally hemispherical shape. In the illustrated embodiment, the energy directors 80 are arranged in multiple rows extending along the welding surface 60. The energy directors 80 generally form a grid pattern along the welding surface 60. In other embodiments, the energy directors 80 are arranged in order to reduce the possibility that large portions of the seam 40 are aligned with valleys or spaces between the energy directors 80, which would prevent consistent welding along the seam 40 and result in large gaps between welds. For instance, in some embodiments, the rows of energy directors 80 may be staggered relative to one another so that adjacent energy directors 80 are offset. In other embodiments, the energy directors 80 are arranged such that the maximum distance between energy directors 80 that form welds on the seam 40 (and therefore the maximum distance between adjacent welds along the seam 40) is less than a predetermined length.

Figure 5:
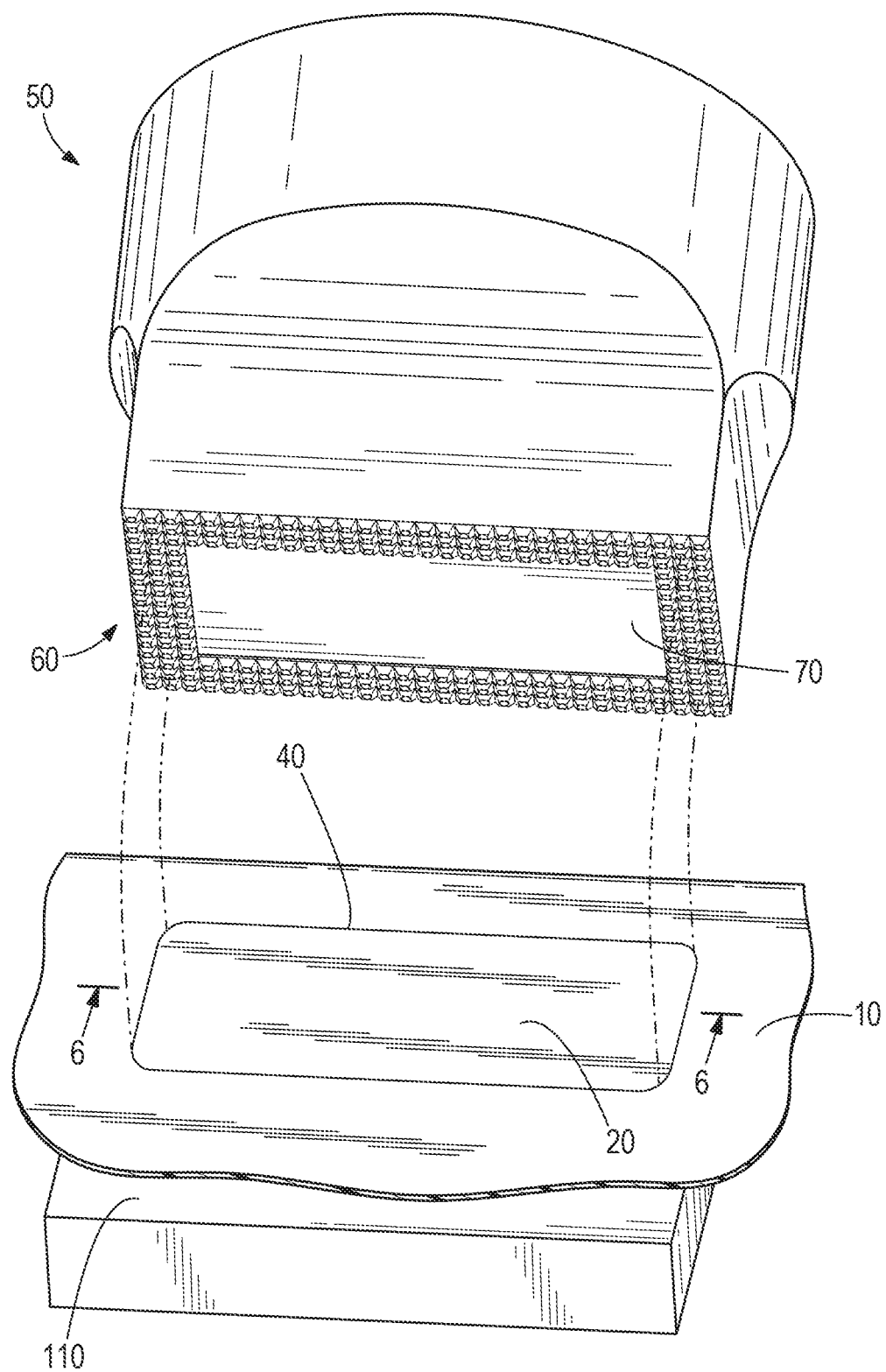
FIG. 5 is a perspective view of the welding horn of FIG. 3 applied to the raceway of FIG. 2.

As shown in FIG. 5, the raceway 10 and the re-inserted knockout 20 are positioned between the horn 50 and an anvil 110. The welding surface 60 is generally aligned with the seam 40 and positioned to contact both the raceway 10 and the knockout 20. As shown in FIGS. 6 and 7, at least some of the energy directors 80 straddle or span across the seam 40 and contact both workpieces, creating several discrete welds along the seam 40 between the raceway 10 and the knockout 20. The welding horn 50 transmits an acoustic vibration to the raceway 10 and the knockout 20 to melt each workpiece along the seam 40. The energy directors 80 concentrate the acoustic vibration laterally to melt the adjacent edges of the raceway 10 and knockout 20. As the melted edges are solidified, the raceway 10 and the knockout 20 are bonded so that the knockout 20 may be removed by a user without the need for tools and without deforming the raceway 10. In one embodiment, the welding surface 60 is applied to the seam 40 for between approximately one and three seconds, and applies a vibration at a frequency of approximately 20,000 cycles per second (20 kHz) and an amplitude of approximately 1.5 thousandths of an inch. These parameters can be altered to adjust the strength of the weld with a high degree of accuracy.

Figure 8:
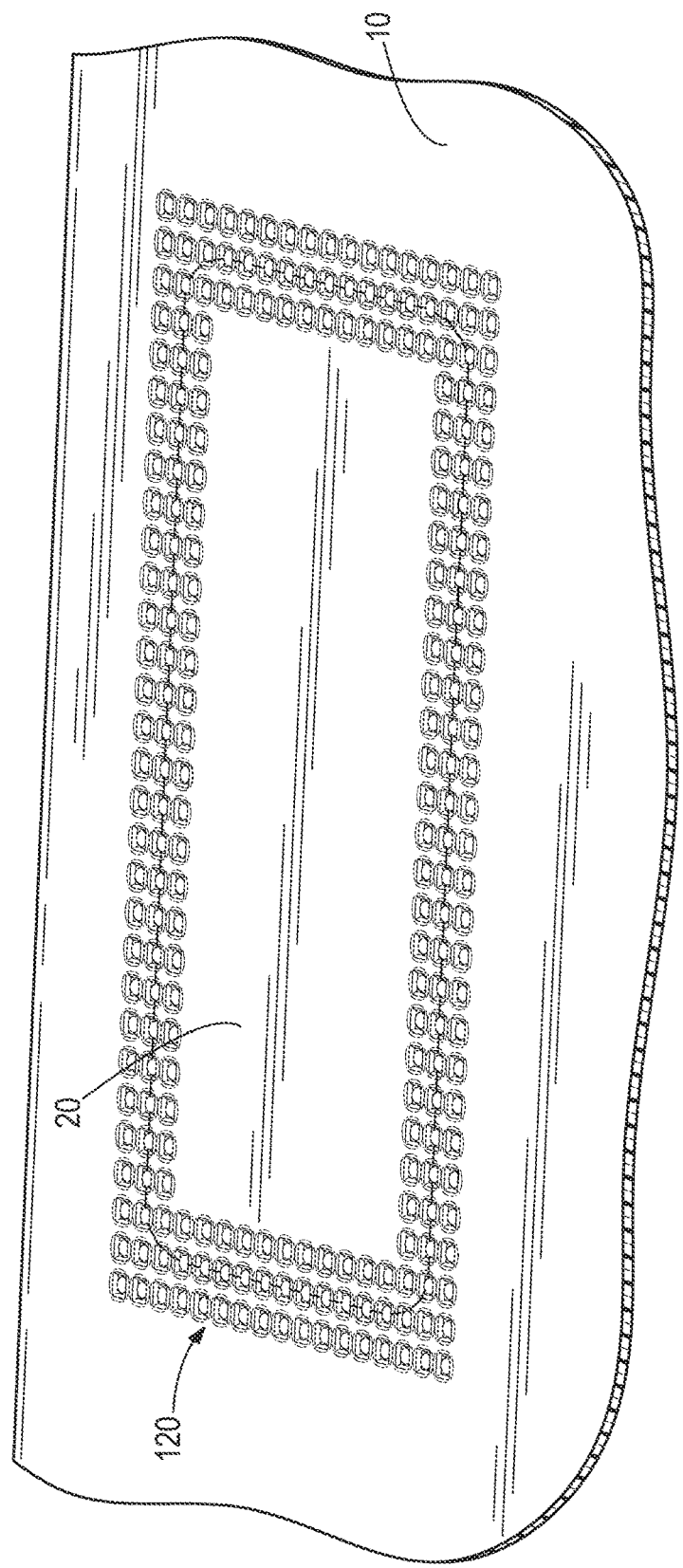
FIG. 8 is a perspective view of one side of the raceway of FIG. 2 with the knockout re-attached.
Figure 9:
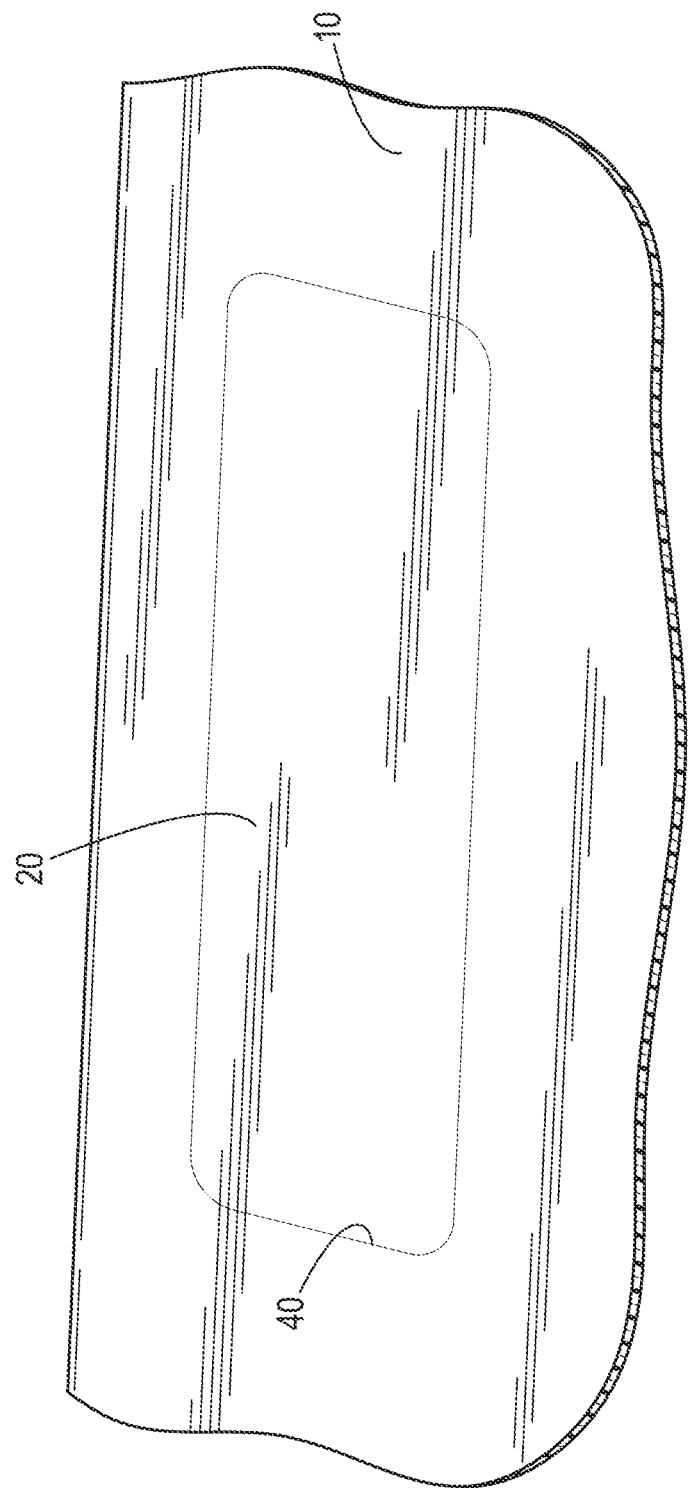
FIG. 9 is a perspective view of the other side of the raceway of FIG. 2 with the knockout re-attached.

As shown in FIG. 8, the horn 50 forms multiple impressions 120 on the side of the raceway 10 to which the horn 50 is applied. The impressions 120 correspond to the shape of the energy directors 80. By comparison, FIG. 9 shows that the reverse side of the raceway 10 does not include any impressions. To remove the knockout 20, a user applies pressure to the knockout 20 to cause the knockout 20 to break away from the raceway 10 along the seam 40. The user may then pass conduit, such as electric wiring, through the resulting opening 30. The welding process provides a method for re-attaching the knockout 20 to the raceway 10 such that the knockout 20 is flush with and uniform with the raceway 10, and so that the knockout 20 will not fall out of the opening 30 until the user wishes to remove the knockout 20. In addition, the welding horn 50 permits two adjacent workpieces to be joined along an edge rather than requiring that the workpieces overlap.

In the illustrated embodiment, the raceway 10 and knockout 20 have the same thickness, and the surfaces of the raceway 10 and the knockout 20 to which a welding horn 50 is applied are coplanar.

FIG. 10 illustrates another embodiment of the welding horn 250. In this embodiment, the energy directors 280 are arranged in multiple rows extending the length of the welding surface 260 and generally form a grid pattern along the welding surface 260. However, each energy director 280 is rotated about an axis extending perpendicularly from the welding surface 260. As a result, the grid pattern includes rows of energy directors 280 that extend in a direction that forms an acute angle with respect to an edge of the welding surface 260, rather than being parallel or perpendicular to the edge. In the illustrated embodiment, the angle is approximately 45 degrees relative to an edge of the welding surface 260. In other embodiments, the angle may be changed to increase the contact between both workpieces and an energy director, or to accommodate the geometry of the seam. The angled orientation reduces the possibility that a seam between two workpieces (e.g., seam 40) will be aligned along a space between the energy directors 280, which would prevent the energy director 280 from contacting both workpieces across the seam and inhibit welding. The angled orientation of the energy directors 280 therefore improves the quality of the weld. FIG. 11 illustrates a pattern of impressions 320 formed on the side of the raceway 10 to which the horn 250 is applied.

In other applications, the first workpiece and the second workpiece have different thicknesses so that the surfaces to which the welding horn 50 is applied are coplanar but the reverse surfaces are not coplanar. Also, in other embodiments the surfaces of the first workpiece and the second workpiece to which the welding horn 50 is applied are substantially coplanar but are offset by a small distance.

Various features of the invention are set forth in the following claims.

What is claimed is:

1. A welding horn for welding plastic material along a weld seam, the welding horn comprising:
    a welding surface; and
    a plurality of energy directors positioned on the welding surface and adapted to transmit ultrasonic energy to the plastic material, each energy director including a truncated pyramid having a recessed peak.

2. The welding horn of claim 1, wherein the welding surface has a shape substantially corresponding to a shape of the weld seam.

3. The welding horn of claim 1, wherein the welding surface forms a closed shape.

4. The welding horn of claim 1, wherein the recessed peak of the energy director includes a dimple having a generally hemispherical shape.

5. The welding horn of claim 1, further comprising a non-welding surface adjacent the welding surface.

6. The welding horn of claim 5, wherein the welding surface at least partially encloses the non-welding surface.

7. The welding horn of claim 1, wherein the plurality of energy directors are arranged such that at least some of the energy directors are adapted to span across the weld seam and form a weld therein, wherein a maximum distance between adjacent energy directors that span across the seam is less than a predetermined maximum length.

8. The welding horn of claim 1, wherein the plurality of energy directors are arranged in multiple rows extending along the welding surface.

9. The welding horn of claim 8, wherein the rows of the plurality of energy directors are oriented at an acute angle with respect to an edge of the welding surface.

10. A welding horn for welding plastic material along a weld seam, the welding horn comprising:
- a welding surface; and
- a plurality of energy directors positioned on the welding surface and adapted to transmit ultrasonic energy to the plastic material, the plurality of energy directors arranged in multiple rows, each row oriented at an acute angle with respect to an edge of the welding surface such that at least some of the energy directors are adapted to span across the weld seam, each of the energy directors including a truncated pyramid and a recess, the truncated pyramid having an end surface, the recess formed on the end surface.

11. The welding horn of claim 10, wherein the welding surface has a shape substantially corresponding to a shape of the weld seam.

12. The welding horn of claim 10, wherein the welding surface has a substantially rectangular shape.

13. The welding horn of claim 10, wherein the welding surface forms a closed shape.

14. The welding horn of claim 10, wherein the recess includes a dimple having a generally hemispherical shape.

15. The welding horn of claim 10, further comprising a non-welding surface adjacent the welding surface.

16. The welding horn of claim 15, wherein the welding surface at least partially encloses the non-welding surface.

17. The welding horn of claim 10, wherein a maximum distance between adjacent energy directors that span across the weld seam is less than a predetermined maximum length.

* * * * *